(12) United States Patent
Mans (10) Patent No.: US 10,640,296 B2
(45) Date of Patent: May 5, 2020

(54) DRUM MOTOR WITH ALTERNATIVE TRANSMISSION MOUNT

(71) Applicant: INTERROLL HOLDING AG, Sant' Antonino (CH)

(72) Inventor: Erwin Mans, Waldfeucht-Haaren (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 16/313,952

(22) PCT Filed: Jun. 29, 2017

(86) PCT No.: PCT/EP2017/066173
§ 371 (c)(1),
(2) Date: Dec. 28, 2018

(87) PCT Pub. No.: WO2018/002246
PCT Pub. Date: Jan. 4, 2018

(65) Prior Publication Data
US 2019/0225428 A1    Jul. 25, 2019

(30) Foreign Application Priority Data
Jun. 30, 2016   (DE) .................. 10 2016 112 054

(51) Int. Cl.
*B65G 23/08* (2006.01)
*B65G 13/06* (2006.01)

(52) U.S. Cl.
CPC ............. *B65G 23/08* (2013.01); *B65G 13/06* (2013.01)

(58) Field of Classification Search
CPC ................................ B65G 23/08; B65G 13/06

USPC ......................................................... 198/788
See application file for complete search history.

(56) References Cited

U.S. PATENT DOCUMENTS

| 3,892,144 A | 5/1975 | Kirkegaard |
| 5,180,344 A | 1/1993 | Hall |
| 5,442,248 A | 8/1995 | Agnoff |
| 5,485,590 A | 1/1996 | Hyatt et al. |
| 5,530,643 A | 6/1996 | Hodorowski |
| 6,117,318 A | 9/2000 | Simonelli |
| 6,124,656 A | 9/2000 | Jensen |

(Continued)

FOREIGN PATENT DOCUMENTS

| AT | 508662 | 3/2011 |
| AT | 13066 | 5/2013 |

(Continued)

*Primary Examiner* — Mark A Deuble
(74) *Attorney, Agent, or Firm* — Price Heneveld LLP (57) ABSTRACT

A motor-driven conveyor roller comprises a conveyor roller tube, a first axle unit inserted into a first end of the conveyor roller tube, a first bearing unit at the first end, around which the conveyor roller tube is mounted so as to be correspondingly rotatable around the first axle unit, a drive unit, and a first gearing arranged in the conveyor roller tube and which transmits a torque, generated by the drive unit, between the conveyor roller tube and the first axle unit.

An end cap is connected fixedly in terms of torque to the conveyor roller tube at the first end and to which the first gearing is connected fixedly in terms of torque at a first gearing connection section of the end cap, wherein the end cap has a second gearing connection section, which is different from the first gearing connection section.

23 Claims, 5 Drawing Sheets

(56) References Cited

U.S. PATENT DOCUMENTS

| | | | |
|---|---|---|---|
| 6,200,036 B1 | 3/2001 | Girardey | |
| 6,240,335 B1 | 5/2001 | Wehrung et al. | |
| 6,443,295 B1 | 9/2002 | Hill | |
| 6,633,278 B1 | 10/2003 | Hoegener et al. | |
| 6,672,449 B2 | 1/2004 | Nakamura et al. | |
| 6,701,214 B1 | 3/2004 | Wielebski et al. | |
| 6,837,364 B2 * | 1/2005 | Kanaris | B65G 23/08 198/782 |
| 7,207,433 B2 | 4/2007 | Schaefer | |
| 7,618,352 B1 * | 11/2009 | Wei | A63B 22/0257 198/788 |
| 8,006,829 B2 | 8/2011 | Itoh et al. | |
| 8,381,901 B2 | 2/2013 | Yamamoto | |
| 8,757,363 B2 | 6/2014 | Combs et al. | |
| 8,789,686 B2 * | 7/2014 | Lindemann | B65G 23/08 198/788 |
| 9,359,142 B2 | 6/2016 | Jepsen | |
| 9,618,056 B2 | 4/2017 | Itoh | |
| 9,731,900 B2 | 8/2017 | Ruggeri | |
| 2002/0010527 A1 | 1/2002 | Wielebsi et al. | |
| 2003/0017898 A1 | 1/2003 | Hill | |
| 2003/0168316 A1 | 9/2003 | Knepple et al. | |
| 2004/0144623 A1 | 7/2004 | Newsom et al. | |
| 2004/0163934 A1 | 8/2004 | Kanaris | |
| 2005/0083188 A1 | 4/2005 | Choi | |
| 2006/0293782 A1 | 12/2006 | Rees | |
| 2007/0197072 A1 | 8/2007 | Hvidberg et al. | |
| 2008/0270427 A1 | 10/2008 | Franke et al. | |
| 2010/0322473 A1 | 12/2010 | Taylor et al. | |
| 2012/0024669 A1 | 2/2012 | Danelski et al. | |
| 2012/0175223 A1 | 7/2012 | Breen et al. | |
| 2012/0175225 A1 | 7/2012 | Breen et al. | |
| 2012/0211330 A1 | 8/2012 | Ziegler | |
| 2012/0259436 A1 | 10/2012 | Resurreccion et al. | |
| 2012/0290126 A1 | 11/2012 | Combs et al. | |
| 2013/0134017 A1 | 5/2013 | Hall et al. | |
| 2013/0190915 A1 | 7/2013 | Choo et al. | |
| 2014/0156063 A1 | 6/2014 | Neiser et al. | |
| 2014/0277698 A1 | 9/2014 | Combs et al. | |
| 2014/0326582 A1 | 11/2014 | Sakaguchi | |
| 2015/0068874 A1 | 3/2015 | Jepsen et al. | |
| 2015/0151921 A1 | 6/2015 | Collot | |
| 2016/0080526 A1 | 3/2016 | Meyer-Graefe | |
| 2016/0318714 A1 | 11/2016 | Reischl | |
| 2018/0009607 A1 | 1/2018 | Tiedemann | |

FOREIGN PATENT DOCUMENTS

| | | |
|---|---|---|
| CN | 2033808 U | 3/1989 |
| CN | 2199164 Y | 5/1995 |
| CN | 201932650 | 8/2011 |
| CN | 203682423 U | 7/2014 |
| CN | 203714640 | 7/2014 |
| CN | 104860023 | 8/2015 |
| DE | 499227 | 6/1930 |
| DE | 1842769 | 11/1961 |
| DE | 1978258 | 2/1968 |
| DE | 3538173 | 1/1987 |
| DE | 4230729 | 3/1993 |
| DE | 69306884 | 5/1997 |
| DE | 19811130 | 9/1999 |
| DE | 102006004421 | 8/2006 |
| DE | 102006054575 | 9/2008 |
| DE | 102008053557 | 9/2009 |
| DE | 102008018205 | 12/2009 |
| DE | 202008017534 | 12/2009 |
| DE | 20200902821 | 2/2011 |
| DE | 202009012822 | 2/2011 |
| DE | 202012000793 | 4/2012 |
| DE | 102010044027 | 5/2012 |
| DE | 102011004802 | 8/2012 |
| DE | 102011109531 | 2/2013 |
| DE | 102014018769 | 3/2016 |
| DE | 102015106026 | 8/2016 |
| DE | 102015104130 | 9/2016 |
| DE | 102015106034 | 10/2016 |
| DE | 102015106024 | 11/2016 |
| DE | 102015107167 | 11/2016 |
| DE | 102015114030 | 3/2017 |
| EP | 1021664 | 1/2002 |
| EP | 1454851 | 9/2004 |
| EP | 1656312 | 5/2006 |
| EP | 1675244 | 6/2006 |
| EP | 1742333 | 1/2007 |
| EP | 2369211 | 9/2011 |
| EP | 2455310 | 5/2012 |
| EP | 3212543 A1 | 9/2017 |
| JP | S5741821 | 3/1982 |
| JP | S5890447 | 5/1983 |
| JP | S59180609 | 10/1984 |
| JP | S6015308 | 1/1985 |
| JP | H05236612 | 9/1993 |
| JP | 2003026603 | 1/2003 |
| JP | 2003104534 | 4/2003 |
| JP | 2004098554 | 4/2004 |
| JP | 2014516895 | 7/2014 |
| JP | 2014142740 | 8/2014 |
| WO | 8300954 | 3/1983 |
| WO | 0203153 | 1/2002 |
| WO | 02098768 | 5/2002 |
| WO | 201014029 | 12/2010 |
| WO | 2010142029 | 12/2010 |
| WO | 2011029120 | 3/2011 |
| WO | 2012094690 | 7/2012 |
| WO | 2012113922 | 8/2012 |
| WO | 2012154650 | 11/2012 |
| WO | 2013000006 | 1/2013 |
| WO | 2013000006 A2 | 1/2013 |
| WO | 2014011459 | 1/2014 |
| WO | 2014057984 | 4/2014 |
| WO | 2016066495 A1 | 5/2016 |
| WO | 2016169982 | 10/2016 |
| WO | 2016169986 | 10/2016 |
| WO | 2016177906 | 10/2016 |
| WO | 2014178399 | 2/2017 |
| WO | 2018009607 A1 | 1/2018 |

* cited by examiner

DRUM MOTOR WITH ALTERNATIVE TRANSMISSION MOUNT

CROSS-REFERENCE TO FOREIGN PRIORITY APPLICATION

The present application claims the benefit under 35 U.S.C. §§ 119(b), 119(e), 120, and/or 365(c) of PCT/EP2017/066173 filed Jun. 29, 2017, which claims priority to German Application No. 102016112054.5 filed Jun. 30, 2016.

FIELD OF THE INVENTION

The invention relates to a motor-driven conveyor roller comprising: a conveyor roller tube, a first axle unit, which is inserted into a first end of the conveyor roller tube, a first bearing unit at the first end, around which the conveyor roller tube is mounted so as to be correspondingly rotatable around the first axle unit, a drive unit, and a first gearing, which is arranged in the conveyor roller tube and which transmits a torque, generated by the drive unit, between the conveyor roller tube and the first axle unit. A further aspect of the invention is a conveyor roller system and a method for producing a motor-driven conveyor roller.

FIELD OF THE INVENTION

Motor-driven conveyor rollers of said type are used for various purposes. A central application of such motor-driven conveyor rollers are relatively large and relatively small logistics units or conveyor devices, in which such motor-driven conveyor rollers are used as elements of drive conveyors together with idling rollers or driven rollers, which are driven to rotate by the motor-driven conveyor roller via chains, belts, or the like. Here, the rollers are arranged one behind the other and form a conveyor path. Within the context of this invention, a motor-driven conveyor roller is also to be understood as meaning a so-called drum motor, which serves, for example, as a drive element for belt-type conveyors and, for this purpose, has a relatively high power class, possibly inner cooling by a liquid, and a relatively high load stage of the gearing compared with motor-driven conveyor rollers for roller conveyor paths.

BACKGROUND OF THE INVENTION

Motor-driven conveyor rollers basically consist of an electric drive motor in the interior of a conveyor roller tube, which sets the conveyor roller tube in rotation relative to an axle. In this case, the axle is typically held positionally fixed in a frame and fixed in terms of torque and may be formed by two individual axle stubs at both ends of the conveyor roller or else by a continuous axle body.

Motor-driven conveyor rollers are products which are subjected to various high requirements. A high degree of smooth running is required to keep the noise level low in conveyor devices which typically have multiple such motor-driven conveyor rollers. A low-cost production method is also required since products which are used in large quantities are involved. The availability of motor-driven conveyor rollers in different variants is also required. In this regard, for various applications, motor-driven conveyor rollers having different lengths of the conveyor roller tube are also required, in order to be matched to in each case specific product dimensions or conveying capacities. Furthermore, different requirements with regard to the rotational speed or conveying speed and with regard to the torque are imposed on motor-driven conveyor rollers.

A motor-driven conveyor roller in which a drive unit is arranged within a conveyor roller tube and is coupled to a gearing within the conveyor roller tube is already known from DE 20 2009 012 821 U1. The drive of the conveyor roller tube is realized by coupling of the gearing to an end-side cap which is coupled fixedly in terms of torque to the conveyor roller tube and in which an axle, which projects from the conveyor roller tube, is mounted.

A drive roller arrangement for a belt-type conveyor in which, likewise, a drive device and a gearing are arranged within a drum body is already known from DE 69306884 T2.

Drive devices in which a drive unit and a gearing are arranged within a cylindrical drum body and the drum body is set in rotation by said drive unit are likewise already known from DE 35 38 173 C1, US 2015/0068874 A1, U.S. Pat. Nos. 6,124,656 and 5,442,248.

It is fundamentally known to produce and to offer motor-driven conveyor rollers of differing type for this purpose. In this case, the components of the respective individual motor-driven conveyor roller are carefully coordinated with one another, and meet the imposed requirements overall, in that the electric motor and gearing are matched for example to the speed and torque required in the conveyor device, or in that an electric motor is, with regard to its power, matched to the conveyor roller tube length. Basically, the result thus achieved is a technically balanced motor-driven conveyor roller, which is coordinated with regard to its components in a manner matching one another and reliably achieves a desired long service life.

Motor-driven conveyor rollers are produced with different powers and power characteristics. Specifically for drum motors, but also for smaller motor-driven conveyor rollers, it is desirable to be able to provide embodiments with high rotational speeds and embodiments with large torques. This requirement has an effect on the entire drive train of the conveyor roller. In this regard, in addition to the drive motor, the gearing and the torque-transmitting components are subjected to high loads, these, however, being of different types, if on the one hand a motor-driven conveyor roller is configured with a particularly high rotational speed, or if on the other hand a motor-driven conveyor roller is configured with a particularly high torque.

In order to provide motor-driven conveyor rollers having such properties, different types of gearings are used. Use is often made of planetary gearings which, in particular, if a large torque is sought at the conveyor roller tube, are of multi-stage design and thus achieve a very large reduction ratio. As a result, very large torques act at the gearing output and in the torque-transmitting components of the conveyor roller from the gearing output to the conveyor roller tube, with simultaneously low rotational speed.

In other applications, use is made of gearings having only a low reduction ratio, partially also as gearings which are designed as a direct axle through drive and which have a direct drive from the drive motor to the conveyor roller tube. In the case of these types, very high rotational speeds of the conveyor roller tube and the rotation-transmitting components of the conveyor roller occur.

The gearing of a motor-driven conveyor roller and the torque-transmitting components are subjected to various—partly conflicting—requirements. Firstly, the gearing accounts for a large proportion of the running noises generated by a conveyor roller. With the objective of minimizing these running noises, use is made of gearings which consist largely of plastic, for example have a plastic housing and plastic toothed gears. However, this construction is not able to bear loads sufficiently, in particular, if very large torques are transmitted, and so gearings produced from metallic materials have proven to be successful for conveyor rollers that are designed for a large torque.

The integration of these different gearing types, with different output torques and output rotational speeds, into a conveyor roller necessitates matching to the loads occurring. A problem that arises is that this matching is complex in terms of production, and precisely when gearings from the extremes of the design spectrum, that is to say, having either a very high speed at the gearing output or a very large torque at the gearing output, are used, no satisfactory transmission of the torque from the gearing output to the conveyor roller tube is achieved.

SUMMARY OF THE INVENTION

The invention is based on the object of providing a conveyor roller or a conveyor roller system, in which the integration of gearings of differing type within the conveyor roller is possible in a better manner than in the prior art.

According to the invention, this object is achieved by a motor-driven conveyor roller of the above-described type, which is refined by an end cap that is connected fixedly in terms of torque to the conveyor roller tube at the first end and to which the first gearing is connected fixedly in terms of torque at a first gearing connection section of the end cap, wherein the end cap has a second gearing connection section, which is different from the first gearing connection section.

The conveyor roller according to the invention has an end cap which is inserted into the conveyor roller tube and which has improved functionality. The end cap is preferably connected fixedly in terms of torque to the conveyor roller tube. According to the invention, the end cap has a first and a second gearing connection section. Said two gearing connection sections are neither formed in an integral manner nor of identical construction, but are both spaced apart from one another and different from one another. The difference of the two gearing connection sections of the end cap can be in different dimensioning, but can also, in particular, be in different functioning. In this regard, it is possible, for example, for one of the two gearing connection sections to be designed for connection to the gearing output by means of a force fit or frictional engagement, and for the other gearing connection section to be designed for connection to a gearing output by means of a material bond or a form fit. The invention makes it possible for gearings of different type to be individually integrated into the conveyor roller, and to be connected in this case either to the first or to the second gearing connection section of the end cap, and in this way to be coupled to the conveyor roller tube.

It is basically to be understood that the invention is represented in the provision of the first and second gearing connection sections. This provision of two gearing connection sections makes it possible for a first gearing or a second gearing to be mounted in the conveyor roller and connected to the end cap. Here, according to the invention, the first gearing is connected to the first gearing connection section. If instead of the first gearing a second gearing of another design or type is used, this second gearing is connected to the second gearing connection section. For both gearings, it is, therefore, possible to achieve a manner of connection to the end cap which is coordinated with the type, size or material.

In certain applications, it is also possible for a gearing to be connected to the first and the second gearing connection sections. This may be advantageous for the transmission of particularly large torques or for achieving particularly precise coaxial positioning of the gearing output with respect to the conveyor roller tube. Said type, which additional assembly effort owing to the associated twofold assembly of the gearing to the two gearing connection sections, said assembly typically being carried out in a simultaneous manner, is reserved for such particular applications, it being basically understood that, depending on the gearing, the invention preferably alternatively uses the first or the second gearing connection section for transmitting the torque.

According to a first preferred embodiment, the first gearing connection section provides a force-fitting connection fixed in terms of torque to the first gearing. In this embodiment, the torque is transmitted from the gearing output to the gearing connection section and thus the end cap by means of a force fit, that is to say, by transmission of frictional forces. Such a force fit may be achieved by a clamped connection, this in particular being able to be brought about by the provision of a press fit between the first gearing connection section and the gearing output.

Within the context of the invention, a gearing output is to be understood as meaning a gearing component which acts in a torque-transmitting manner. With a gearing, it is basically to be understood that a torque support of the gearing on one side, a torque input at the gearing input, and a torque output at the gearing output are provided. Depending on the type of gearing, this may involve different designs, both the sun gear and a planet carrier or the internal gear being able to be used, for example, as a gearing output in the case of a planetary gearing, each of these three components being able to be used itself for torque support and each of these three components being able to be used as a gearing input. The gearing connection section according to the invention can thus be used correspondingly for torque support at the gearing input or at the gearing output, and for torque support of the gearing itself. A configuration in which the first or the second gearing connection section already constitutes a gearing component itself, for example an internal gear, is likewise encompassed. In this case, the gearing connection section interacts with the gearing components of the gearing for generating the desired reduction or transmission ratio in combination, and the torque support acts between the gearing component formed integrally on the end cap on one side and the components of the gearing in engagement therewith on the other side.

The force-fitting connection between the gearing and the gearing connection section is suitable, in particular, for the transmission of large torques and if use is made of gearings, which are produced from metallic materials. Furthermore, a force-fitting connection between the gearing and the gearing connection section is particularly well suited for conveyor rollers, which require a high degree of rotation position accuracy. According to the findings of the inventor, one problem in the prior art is that gearings that are at least partially produced from plastic are not of adequate form over the long term for the stresses which occur with such a press fit. In order to transmit a sufficiently large torque via a force-fitting connection, it is necessary for a high degree of pressing to be maintained in the connection over the entire service life. Under such a high degree of pressing, plastics have a tendency to exhibit viscous or viscoelastic behavior and may, therefore, via the service life deformation, reduce the degree of pressing in the force-fitting connection. More-over, this effect is amplified if high temperatures occur, which is by all means possible with high stress of conveyor rollers in the interior thereof.

According to a further preferred embodiment, it is provided that the second gearing connection section provides a non-force-fitting connection fixed in terms of torque to a second gearing, which is different from the first gearing and is able to be mounted instead of the first gearing in the conveyor roller tube. According to said embodiment, a non-force-fitting connection possibility is provided by the second gearing connection section. This configuration is in particular advantageous for being able to reliably integrate into the conveyor roller gearings of a type not well suited for a force-fitting connection, such as, for example, gearings that are at least partially produced from plastic parts. By way of the attachment in a manner other than by a force fit, that is to say, in particular, by a material bond or a form fit, it is possible for an expedient attachment to be achieved for gearings of such a different type. In this regard, gearing components composed of plastic are particularly well suited for torque transmission by means of a form fit, for example, in that a corresponding toothing or another interengagement of material sections of the gearing on one side and of the end cap on the other side is realized in the region of the second gearing connection section. Furthermore, torque transmission by means of a form fit permits a tolerance balance or a positional change under a load between the gearing and the gearing connection section. Likewise, such gearings with plastic components are well suited for adhesive bonding if a detachable connection between the gearing and the end cap is not required.

Here, in particular, it may be provided that the second gearing connection section provides a form-fitting connection fixed in terms of torque to the second gearing. In addition to the force-fitting manner of connection, according to the findings of the inventor, in particular, the form-fitting manner of connection has proven to be particularly well suited as an alternative for certain gearing types. Here, a form fit is to be understood as meaning direct contact of torque-transmitting surfaces with one another, which surfaces are oriented in such a way that the torque is transmitted by transmission of pressure forces. Contrary to transmission by a force fit, which, for torque transmission, applies frictional forces brought about by pressing and thus shear forces running parallel to the transmitting surface, in the case of a form-fitting transmission, the torque is transmitted by a force which is perpendicular to the force-transmitting surface, or which at least has a component which is perpendicular to the force-transmitting surface, without a friction effect between the force-transmitting surfaces being important here. The form-fitting force transmission is less sensitive to the creep behavior of plastics and is, therefore, better suited to the transmission of large torques if use is made of gearings having components composed of plastic.

Surprisingly, it has furthermore been shown that the production of an interface that is suitable for torque transmission by means of a form fit is particularly well suited in the production of plastic parts, whereas the production of an interface that is suitable for torque transmission by means of a force fit is particularly well suited in the production of metallic components. In this regard, ribbing, toothing, projections, or depressions, which serve for the form fit, can be produced particularly easily by primary-forming production, such as, for example, injection molding. By contrast, an inner or outer peripheral surface that has a tolerance for a press fit and which serves as a force-fit-transmitting surface, can be produced particularly well by a machining production method.

According to a further preferred embodiment, it is provided that, with the connection of the first gearing to the first gearing connection section, the second gearing connection section does not interact with the first gearing for torque transmission. As explained above, in the conveyor roller according to the invention, it is particularly preferable if the second gearing connection section does not serve for torque transmission in a functional manner if the first gearing connection section interacts with the first gearing for torque transmission, the gearing output thus being connected to the first gearing connection section. Conversely, it is preferable for the first gearing connection section not to realize a function for torque transmission if, as an alternative to the first gearing, a second gearing is connected with the gearing output to the second gearing connection section and the torque is transmitted in such a way. In principle, the gearing connection section not used for torque transmission may, according to the invention, be used in certain applications for providing centering of the gearing output shaft with respect to the end cap and thus with respect to the conveyor roller tube, and consequently be incorporated in a functional sense. However, it is particularly preferable if the gearing connection section that is in each case not used for torque transmission performs neither a torque-transmitting function nor a centering or other function, so that, on the one hand, the assembly is simplified, and on the other hand, the formation of the gearing output has to be coordinated only with one of the two gearing connection sections, as a result of which production costs can be saved.

It is yet further preferable for the first gearing connection section to be formed by a cylindrical peripheral surface which forms a press fit with a cylindrical peripheral surface of the first gearing, and/or for the second gearing connection section to have an axial surface or a peripheral surface having at least one projection or one depression. According to this embodiment, the first gearing connection section is formed by an outer peripheral surface or an inner peripheral surface which interacts with a corresponding inner peripheral surface or outer peripheral surface of the gearing output and can be joined to form a press fit. As explained above, this manner of connection is particularly suitable for components composed of metallic materials. Here it is to be understood that, in particular, on the gearing output side, a metallic material is preferred for the formation of the peripheral surface. According to the invention, the end cap and thus the first gearing connection section may be produced from plastic. The first end cap can typically be inserted into the conveyor roller tube such that encapsulation and support of the end cap by the conveyor roller tube is achieved. As a result of this encapsulation and support, deformation of the end cap due to the viscous or viscoelastic properties of the plastic are prevented as far as possible, with the result that a press fit which is realized for force-fitting torque transmission by means of such an end cap composed of plastic can reliably transmit large torques over the entire operating period of a conveyor roller. A press fit is to be understood here as meaning a connection of an inner peripheral surface and an outer peripheral surface, in which the inner peripheral surface has a smaller diameter than the outer peripheral surface.

According to the invention, in this embodiment, the second gearing connection section is formed by an axial surface or by a peripheral surface which has at least one projection or one depression. Such a configuration allows a corresponding depression or a corresponding projection at the gearing output to interact with the projection or the depression of the second gearing connection section and a reliable form-fitting connection and torque transmission to be achieved. The interaction may in this case be formed in the manner of an outer toothing, and equally use may be made of an end-side toothing for torque transmission.

A further preferred embodiment of the conveyor roller according to the invention is characterized by a second axle unit, which is inserted into a second end, opposite the first end, of the conveyor roller tube, and by a second bearing unit at the second end of the conveyor roller tube, which is fastened in a second end cap, this being of identical design to the first end cap and fastened in the conveyor roller tube mirror symmetrically with respect to the first end cap relative to a central cross-sectional area of the conveyor roller tube. According to this embodiment, an end cap is also used at the second end of the conveyor roller tube, said cap being of identical construction to the first end cap. As a result of the identical construction of the first and second end caps, on the one hand an error in the assembly of the motor-driven conveyor roller is prevented, and on the other hand the storage of spare parts is reduced, and the costs are reduced in comparison with otherwise individually used end caps at the first and second ends by way of doubling of the production quantity. It is particularly preferable for the second end cap used at the second end also to use in a functional manner one of the two gearing connection sections, in order consequently to bring about for example centering or torque support of the electric motor or of some other functional unit, such as, for example, a sensor or a braking energy conversion unit.

It is yet further preferable for the conveyor roller to be refined by a first sealing element which brings about sealing between the first axle unit and the first end cap and which is fastened in the first end cap. Such a sealing element, which may be arranged on the first end cap and, equally, on the second end cap, is designed in particular as a radial shaft sealing ring, which brings about sealing between rotating components and thus, on the one hand, can prevent the escape of lubricating or cooling liquids from the interior of the conveyor roller into the surroundings, and on the other hand, can prevent the ingress of liquids from the surroundings into the interior of the conveyor roller.

It is yet further preferable for the first gearing to have a motor connection flange and to be coupled by means of the motor connection flange to a motor arranged in the conveyor roller tube. According to this embodiment, the gearing is coupled by means of a motor connection flange to a drive motor that is arranged in the interior of the conveyor roller tube. This may, in particular, be an electric motor.

A further aspect of the invention is a conveyor roller system having a conveyor roller of the above-described type, which is characterized by a second gearing, which has a connection region which forms, with the second gearing connection section, a connection fixed in terms of torque, in particular a connection fixed in terms of torque by means of a form fit. According to this aspect of the invention, a modular system for conveyor rollers is provided. In this system, at least two, preferably more, different gearings are present, and one of these gearings may be selected for a conveyor roller. The selected gearing may then, as one possibility, have torque transmission via the first gearing connection section of the end cap, the selected gearing corresponding to the above-described first gearing in this case. However, the selected gearing may also be of another type and bring about torque transmission via the second gearing connection section, this then corresponding to a second gearing of a type different from the first gearing. The conveyor roller system formed in this manner has high variability with regard to gearing selection and realizes this high variability without it being necessary for corresponding and different multiplicities of torque-transmitting components of the conveyor roller between gearing output and conveyor roller tube to be kept available for the purpose of matching to the gearing. Rather, a connection which is matched to the type and, in particular, to the material or the output torques and rotational speeds of the gearing may be provided from the gearing output to the end cap in the conveyor roller system according to the invention.

The conveyor roller system according to the invention may be refined in that the second gearing connection section has an axial surface or a peripheral surface having at least one projection or one depression, wherein the connection region of the second gearing has a depression or a projection which is supported against the projection or in the depression of the end cap for torque transmission.

The conveyor roller system according to the invention may further be refined in that the first gearing has a first connection region, which consists of a metallic material and interacts with the first gearing connection section, wherein the second gearing has a second connection region, which consists of a polymer material and interacts with the second gearing connection section.

The conveyor roller system according to the invention may yet further be refined in that the first gearing has a first motor connection flange and is able to be coupled by means of the first motor connection flange to a motor arranged in the conveyor roller tube, wherein the second gearing has a second motor connection flange, which is identical to the first connection flange, and is able to be coupled by means of the second motor connection flange to the motor arranged in the conveyor roller tube.

With regard to the conveyor roller system refined in such a manner, reference is made to the explanations given above of the conveyor roller according to the invention with the corresponding configurations and variants and to the functions and advantages explained in this connection.

A further aspect of the invention is a motor-driven conveyor roller that is produced from a conveyor roller system which has been described above. This motor-driven conveyor roller is characterized in particular by high variability with regard to the use of different gearings and makes it possible for a changeover of the conveyor roller in later use from one gearing to another gearing to be realized without it likewise being necessary to replace further components, such as, in particular, the end cap, for this purpose.

Finally, a further aspect of the invention is a method for producing a motor-driven conveyor roller, comprising the steps of: providing a conveyor roller tube having a first and a second end, fastening a first end cap to the first end of the conveyor roller tube, fastening a first axle bearing unit in the first end cap and rotatably mounting a first axle unit to the first axle bearing unit, fastening a first gearing to a first gearing connection section of the first end cap in a force-fitting manner, wherein the first end cap also has a second gearing connection section, and, as an alternative to the first gearing, a second gearing is fastened to the second gearing connection section.

The method according to the invention for producing the conveyor rollers has the advantage that it is thereby possible for motor-driven conveyor rollers which have a high variability with regard to the selection of the gearing to be produced over a short production time and at low production costs without the need for extensive storage.

The method may be refined in that an electric motor is arranged in the conveyor roller tube and mechanically coupled to the conveyor roller tube for the purpose of generating a torque between the conveyor roller tube and the first axle unit.

The method may further be refined by a second axle unit, which is arranged in a second axle bearing unit in a second end cap at the second end of the conveyor roller tube, wherein the second end cap is preferably identical to the first end cap.

With regard to the production method and its refinements, reference is likewise made to the above corresponding explanations concerning the conveyor roller according to the invention and the functions and advantages which have been described in this connection.

BRIEF DESCRIPTION OF THE DRAWINGS

Preferred embodiments of the invention will be described on the basis of the appended figures, in which.

DETAILED DESCRIPTION OF THE EMBODIMENTS

Figure 1:
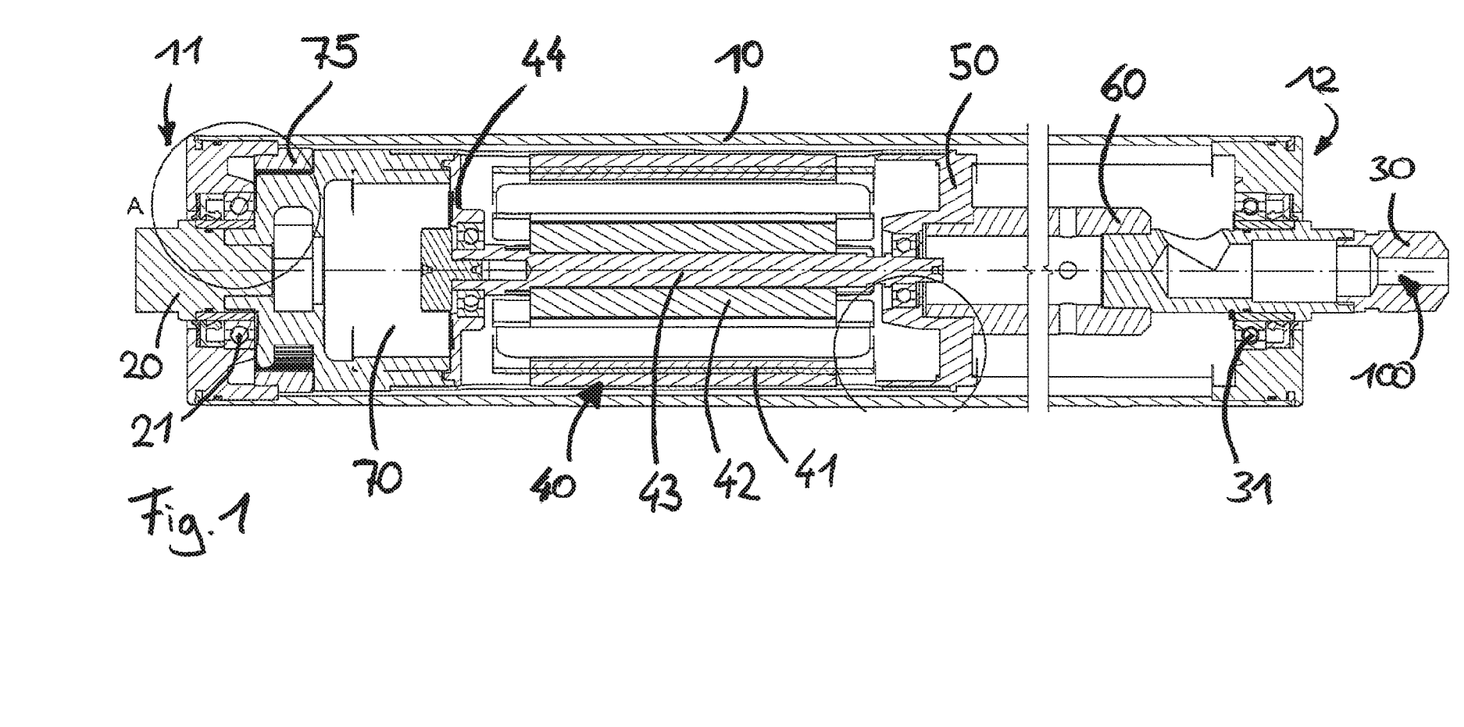
FIG. 1 shows a longitudinally sectioned side view of a first embodiment of a motor-driven conveyor roller according to the invention.

The basic construction of a motor-driven conveyor roller or of a drum motor can be seen from FIG. 1. A conveyor roller tube 10 extends longitudinally from a first end 11 to a second end 12. In the conveyor roller tube 10, a first axle unit 20 is arranged at the first end and a second axle unit 30 is arranged at the second end 12, said axle units 20, 30 being mounted rotatably relative to the conveyor roller tube 10 by means of ball bearings 21, 31. Consequently, the conveyor roller tube 10 can rotate around the axle units 20, 30, which in this case define an axis of rotation 100.

Also arranged in the conveyor roller tube 10 is an electric motor 40, which is designed as a synchronous motor. The stator 41 of the electric motor 40 is coupled fixedly in terms of torque to the second axle unit 30 by means of an intermediate flange 50, and an extension piece 60 and can thereby be held positionally fixed by means of the second axle unit 30. The electric motor 40 comprises a stator 41 arranged on the housing and a rotor 42 arranged in the stator. The rotor 42 is arranged on a rotary shaft 43 which is mounted so as to be rotatable about the axis 100 by means of a ball bearing in the intermediate flange 50 on that side of the electric motor 40 facing the second end 12. On that side of the electric motor facing the first end 11, the rotor shaft 43 is mounted rotatably in a further ball bearing, which is fastened fixedly in terms of torque in a face-side end disk 44 of the electric motor 40.

The face-side end disk 44 of the electric motor 40 is coupled fixedly in terms of torque to a gearing 70. In the exemplary embodiment of the invention shown, the gearing is designed as a metallic planetary gearing having three stages, which is able to bear high loads. The internal gear of the first stage of the gearing, which stage is situated toward the electric motor, is connected fixedly in terms of torque to the face-side end cover 44 of the gearing. The rotor shaft 43 of the electric motor 40 drives the sun gear of the first stage. The planet carrier of the first stage serves as the drive output of the first stage and drives the sun gear of the second stage. The planet carrier of the second stage serves as the drive output of the second stage and drives the sun gear of the third stage. The internal gears of the first two stages are interconnected fixedly in terms of torque and are situated positionally fixed in the conveyor roller tube 10.

The planet carrier of the third stage is connected fixedly in terms of torque to the first axle unit 20 and is therefore positionally fixed. The internal gear 75 of the third gearing stage serves as the drive output of the planetary gearing 70.

Figure 2:
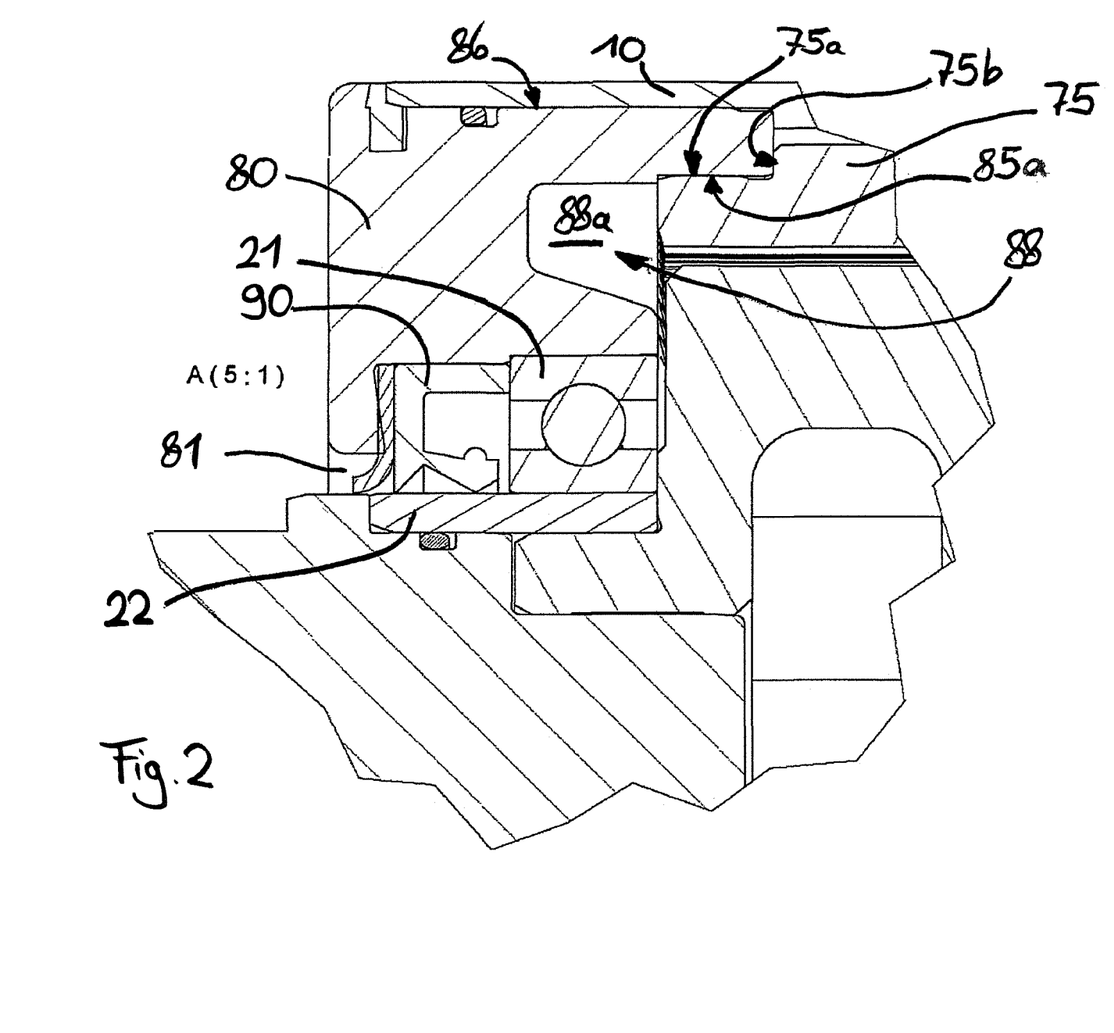
FIG. 2 shows an enlarged detail of the view pursuant to FIG. 1.
Figure 3:
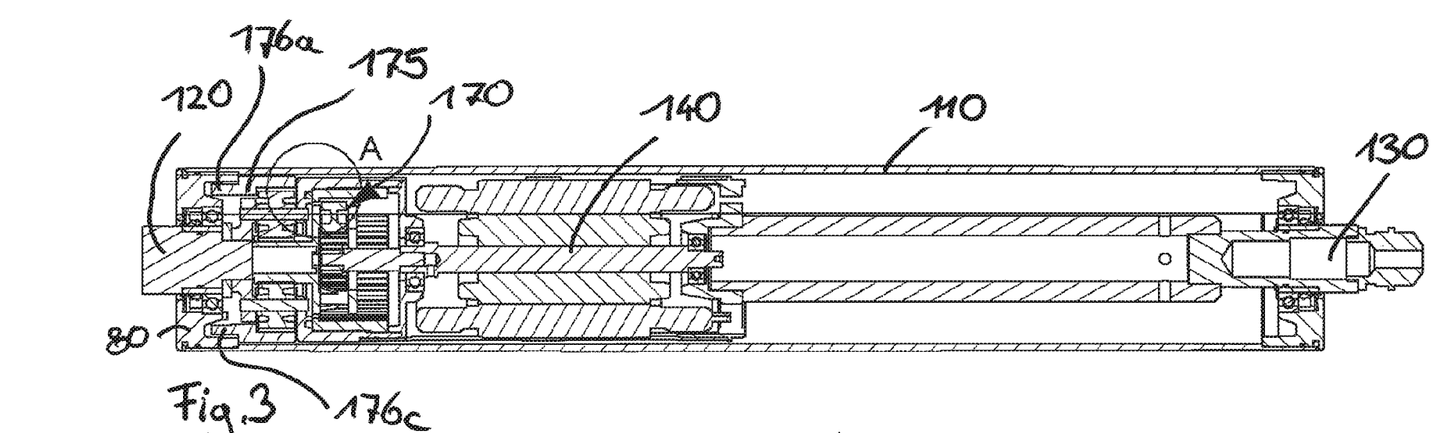
FIG. 3 shows a longitudinally sectioned side view of a second embodiment of a motor-driven conveyor roller according to the invention.

FIG. 2 shows, in a detail providing a better view, the coupling of the drive output of the gearing 70. As can be seen, the internal gear 75 is provided with an encircling shoulder on the side facing the first end 11. Said shoulder contains an outer peripheral surface 75a and an axial face surface 75b. The outer peripheral surface 75a is a surface which is formed with a narrow tolerance and is press-fitted to an inner peripheral surface 85a of an end cap 80. The torque which is generated at the gearing output can therefore be transmitted from the gearing output 75 to the end cap 80 by way of the force-fitting connection between the surfaces 75a and 85a.

The end cap 80 has a passage bore 81 in which a radial shaft sealing ring 90 and the ball bearing 21 are fastened in two corresponding encircling shoulders. The radial shaft sealing ring seals off with respect to the axle unit 20 in that a running ring 22 is arranged on said axle unit and the sealing lip seals off on the outer peripheral surface of said running ring. The ball bearing 21, with its inner ring, likewise bears on the running ring 22. The outer ring of the ball bearing is held in the end cap 80.

The end cap 80 is furthermore pressed into the conveyor roller tube 10 fixedly in terms of torque via an outer peripheral surface 86. A press-fit is likewise realized at this outer peripheral surface 86, and the torque is transmitted via this press fit to the conveyor roller tube.

The end cap 80 furthermore has an axially extending ring-shaped groove on that side of the end cap facing the second end. Said ring-shaped groove is subdivided by multiple radially extending ribs 88a, 88b, 88c, and so on. The ring-shaped groove 88 with the ribs 88a, 88b, 88c, and so on forms a section which is suitable for torque transmission. In the embodiment shown in FIGS. 1 and 2, said section is not required for torque transmission.

FIGS. 3-6 illustrate a second embodiment of the invention. The basic construction of the motor-driven conveyor roller as per this second embodiment corresponds to the construction of the motor-driven conveyor roller as per FIGS. 1 and 2. Just like the latter, the motor-driven conveyor roller illustrated in FIGS. 3-6 comprises an electric motor 140 which is arranged in a conveyor roller tube 110 which is mounted so as to be rotatable around a first axle unit 120 and a second axle unit 130.

The embodiment shown in FIGS. 3-6 is likewise equipped with a gearing 170. This gearing is again designed as a three-stage planetary gearing, the toothed gears of this planetary gearing, however, unlike those of the first embodiment, consisting not of a metallic material but of a polymer material, use being made specifically of toothed gears composed of polyoxymethylene (POM, also known as polyacetal) in the case of this gearing. As in the first embodiment, the internal gear 175 of the third gearing stage serves as a gearing drive output. The internal gear 175 is connected fixedly in terms of torque to the end cap 80 for this purpose. Overall, the end cap 80 is of identical construction to the end cap 80 of the first embodiment. Accordingly, the end cap 80 may be used for both the first and second embodiments of the motor-driven conveyor roller.

In the second embodiment shown in FIGS. 3-6, a press fit is not formed between the gearing drive output and the inner peripheral surface 85a of the end cap 80. The internal gear 175 instead has axially extending fingers 176a, 176b and so on, which engage between the ribs 88a, 88b, 88c, and so on, of the end cap 80. Said fingers 176a, 176b and so on, thus provide a form fit with the ribs 88 of the end cap, and the torque at the gearing output is transmitted via this form fit between the fingers 176a, 176-b and so on, and the ribs 88a, 88b, 88c, and so on, of the end cap. The gearing connection section formed by the inner peripheral surface 185a is unused in the second embodiment. This configuration results in a connection fixed in terms of torque between the end cap 80 and the gearing 170, which connection is ideal for the toothed-gear material POM used.

Figure 4:
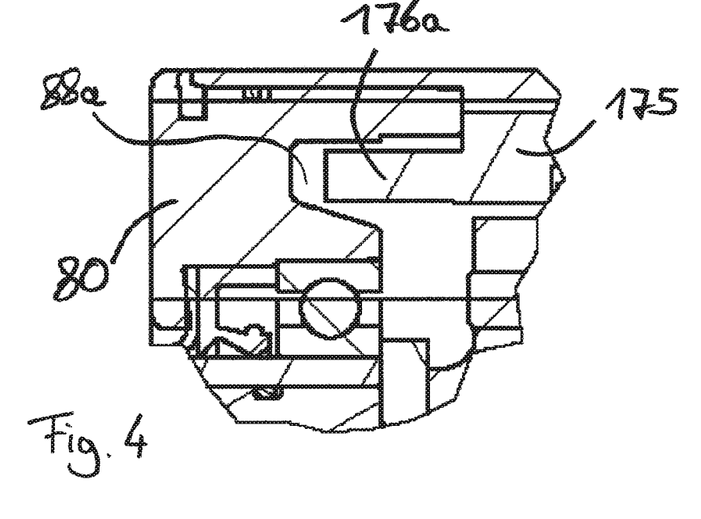
FIG. 4 shows an enlarged detail of the view pursuant to FIG. 3.
Figures 5, 6:
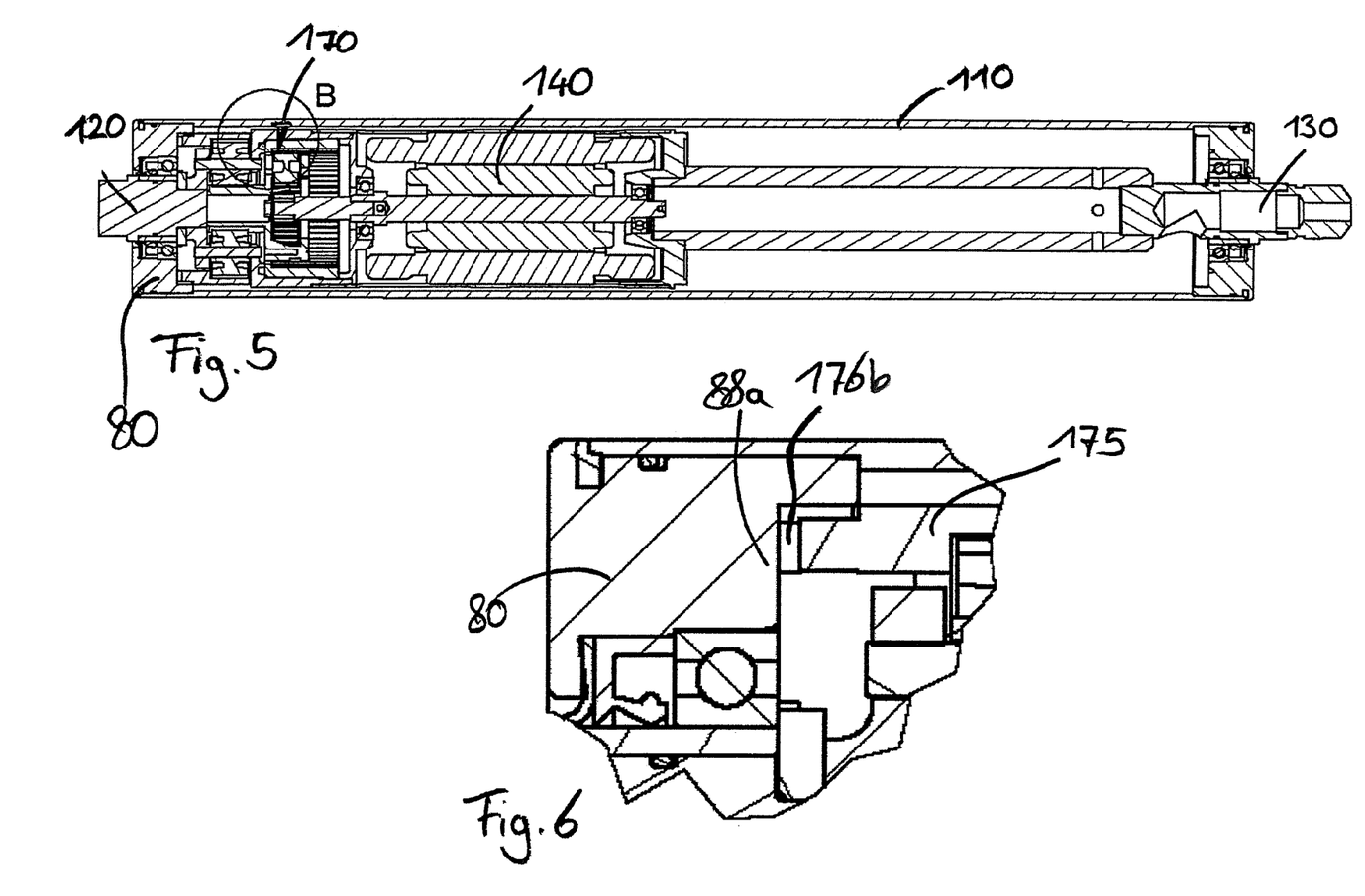
FIG. 5 shows a longitudinally sectioned side view in another section plane of the motor-driven conveyor roller pursuant to FIG. 3.
FIG. 6 shows an enlarged detail of the view pursuant to FIG. 5.

Shown in greater detail in FIG. 4 is a section through a finger 176a which engages into the ring-shaped groove 88 between two ribs 88a, 88b. FIG. 6 shows in greater detail a section which, by comparison, is situated in another section plane. In this section, the section is taken though a rib 88a. As can be seen, no finger of the internal gear 175 extends in this region, but rather there is a depression arranged between the fingers in this angular region.

Figure 7:
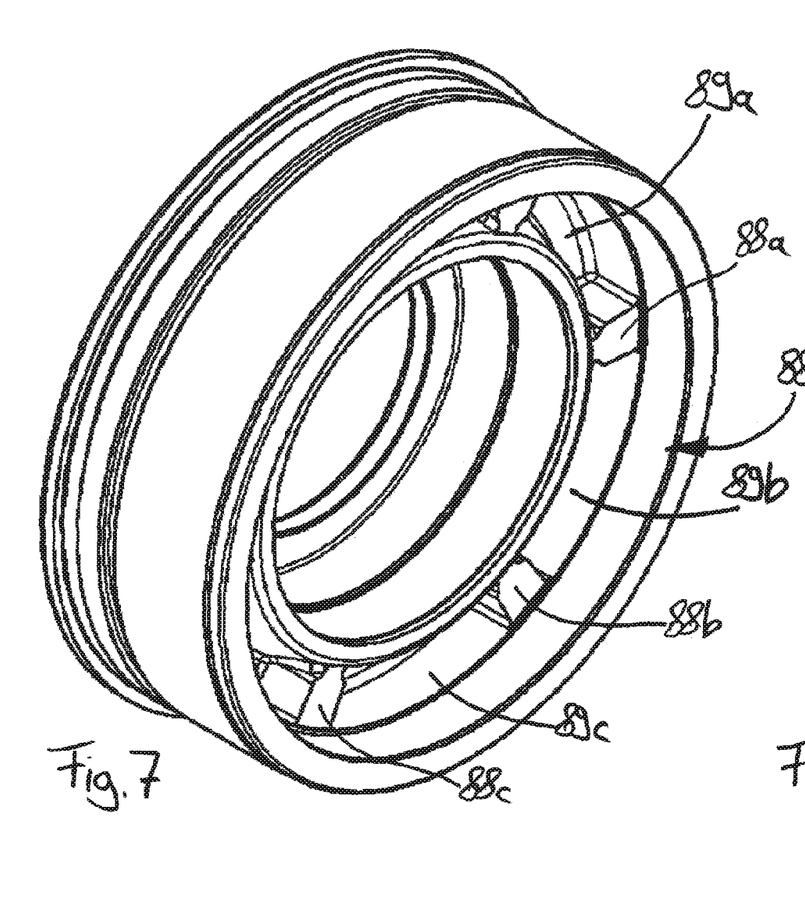
FIG. 7 shows a perspective view of an end cap for a motor-driven conveyor roller according to the invention.

FIG. 7 shows a perspective view of the end cap which is inserted into the conveyor roller tube at the first end in the motor-driven conveyor rollers as per FIGS. 1-6. The radially extending ribs 88a, 88b, 88c, between which in each case depressions into which the fingers 176a, 176b of the internal gear 175 can engage are formed, can be seen.

The wall thickness of the ribs 88 extends slightly conically from the inside outward, and so inwardly there is a smaller wall thickness than outwardly. Consequently, it is possible for the fingers 176a, 176b designed in a manner congruent thereto, to engage into the intermediate spaces 89a, 89b, 89c and to be centered on the ribs 88a, 88b, 88c. The embodiment as per FIG. 2 can thus also bring about reliable centering of the internal gear on the end cap with simultaneous form-fitting force transmission which is fixed in terms of torque.

Figure 8:
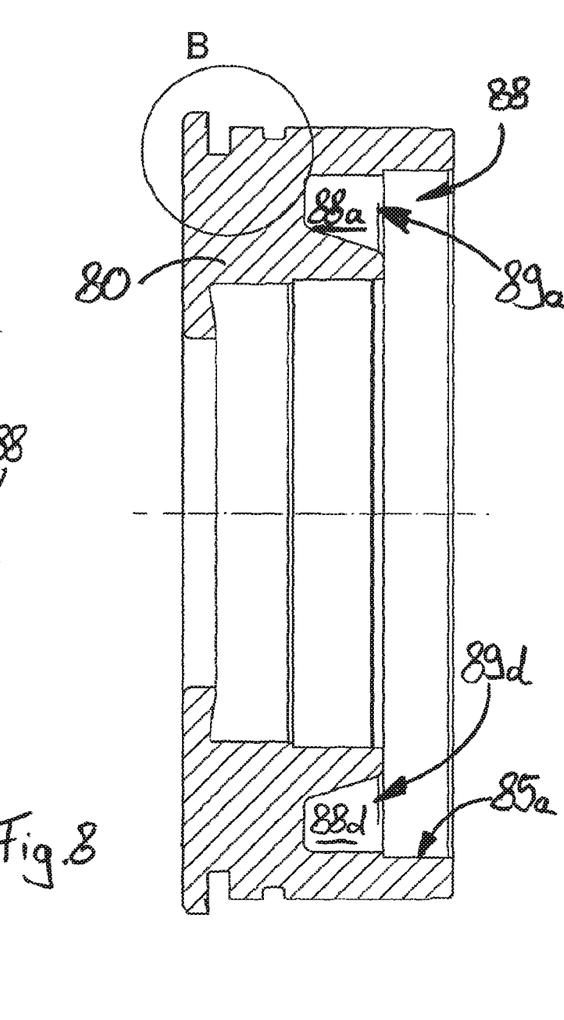
FIG. 8 shows a longitudinally sectioned side view of the end cap pursuant to FIG. 7.

FIG. 8 shows a longitudinal section through the formation of the end cap as per FIG. 7, which is used in the motor-driven conveyor rollers in FIGS. 1-6. The section of FIG. 8 is taken through the intermediate space 89a, 89d between two ribs 88a, 88b and 88d, 88e, and so in each case ribs 88a, 88d are viewed in FIG. 8. The inner peripheral surface 85a, which serves for the formation of the press fit with the outer peripheral surface 75a of the metallic gearing of the first embodiment, can also be seen.

The invention claimed is:

1. A motor-driven conveyor roller comprising:
a conveyor roller tube;
a first axle unit inserted into a first end of the conveyor roller tube;
a first bearing unit at the first end around which the conveyor roller tube is mounted so as to be correspondingly rotatable around the first axle unit;
a drive unit;
a single gearing arranged in the conveyor roller tube and which transmits a torque generated by the drive unit between the conveyor roller tube and the first axle unit; and
an end cap connected fixedly in terms of torque to the conveyor roller tube at the first end, the end cap comprising two portions capable of being utilized as a gearing connection section, wherein alternatively one of the two portions defines the gearing connection section.

2. The conveyor roller as claimed in claim 1, wherein the gearing connection section comprises a force-fitting connection fixed in terms of torque to the single gearing.

3. The conveyor roller as claimed in claim 1, wherein the gearing connection section comprises a non-force-fitting connection fixed in terms of torque to the single gearing.

4. The conveyor roller as claimed in claim 3, wherein the gearing connection section provides a form-fitting connection fixed in terms of torque to the single gearing.

5. The conveyor roller as claimed in claim 2, wherein when the single gearing comprises the force-fitting connection fixed in terms of torque to the single gearing, the second portion of the end cap does not interact with the single gearing for torque transmission.

6. The conveyor roller as claimed in claim 1, wherein the gearing connection section comprises an inner cylindrical peripheral surface of the conveyor roller tube that forms a press fit with an outer cylindrical peripheral surface of the single gearing.

7. The conveyor roller as claimed in claim 6, wherein the gearing connection section has an axial surface or a peripheral surface having at least one projection or one depression.

8. The conveyor roller as claimed in claim 1, further comprising:
a second axle unit inserted into a second end, opposite the first end, of the conveyor roller tube; and
a second bearing unit at a second end of the conveyor roller tube, which is fastened in a second end cap, the second end cap being of identical design to the first end cap and fastened in the conveyor roller tube mirror symmetrically with respect to the first end cap relative to a central cross-sectional area of the conveyor roller tube.

9. The conveyor roller as claimed in claim 1, further comprising a first seal element disposed between the first axle unit and the first end cap and which is fastened in the first end cap.

10. The conveyor roller as claimed in claim 1, wherein the first gearing has a motor connection flange and is coupled by means of the motor connection flange to a motor arranged in the conveyor roller tube.

11. A conveyor roller system having a conveyor roller comprising:
a conveyor roller tube;
a first axle unit inserted into a first end of the conveyor roller tube;
a first bearing unit at the first end around which the conveyor roller tube is mounted so as to be correspondingly rotatable around the first axle unit;
a drive unit; and a single gearing arranged in the conveyor roller tube and which transmits a torque generated by the drive unit between the conveyor roller tube and the first axle unit; and an end cap is-connected fixedly in terms of torque to the conveyor roller tube at the first end, the end cap comprising two portions capable of being utilized as a gearing connection section, wherein alternatively one of the two portions defines the gearing connection;

wherein the gearing connection section fixes the single gearing relative the end cap in terms of torque.

12. The conveyor roller system of claim 11, where the connection formed by the single gearing transmits torque to the end cap by means of a form fit.

13. The conveyor roller system as claimed in claim 11, wherein:

the gearing connection section of the end cap has an axial surface or a peripheral surface having at least one projection or one depression, and the connection region of the single gearing has a depression or a projection which is disposed against the projection or the depression of the end cap for torque transmission.

14. The conveyor roller system as claimed in claim 11, wherein the single gearing consists of a metallic material and interacts with the first-gearing connection section through a first of the two portions capable of being utilized as a gearing connection section, or, alternatively, the single gearing consists of a polymer material and interacts with the gearing connection section through a second of the two portions capable of being utilized as a gearing connection section.

15. The conveyor roller system as claimed in claim 11, wherein the single gearing has a first motor connection flange and the single gearing is adapted to be coupled by the first motor connection flange to a motor arranged in the conveyor roller tube, or, alternatively, the single gearing has a second motor connection flange and the single gearing is adapted to be coupled by the second motor connection flange to the motor arranged in the conveyor roller tube.

16. A motor-driven conveyor roller comprising:
a conveyor roller tube;
a first axle unit inserted into a first end of the conveyor roller tube;
a first bearing unit at the first end around which the conveyor roller tube is mounted so as to be correspondingly rotatable around the first axle unit;
a drive unit;
a gearing arranged in the conveyor roller tube and which transmits a torque generated by the drive unit between the conveyor roller tube and the first axle unit; and
an end cap is connected fixedly in terms of torque to the conveyor roller tube at the first end and to which the first gearing is connected fixedly in terms of torque, the end cap comprising two portions capable of being utilized as a gearing connection section, wherein alternatively one of the two portions is adapted to define the gearing connection section.

17. A method for producing a motor-driven conveyor roller, comprising the steps of:
providing a conveyor roller tube having a first and a second end
fastening a first end cap to the first end of the conveyor roller tube;
fastening a first axle bearing unit in the first end cap and rotatably mounting a first axle unit to the first axle bearing unit; and fastening a first gearing to a first gearing connection section of the first end cap in a force-fitting manner;
wherein the first end cap also has a second gearing connection section and, as an alternative to the first gearing, a second gearing is fastened to the second gearing connection section.

18. The method as claimed in claim 17, further comprising:
an electric motor arranged in the conveyor roller tube and mechanically coupled to the conveyor roller tube for generating a torque between the conveyor roller tube and the first axle unit.

19. The method as claimed in claim 17, further comprising:
a second axle unit arranged in a second axle bearing unit in a second end cap at the second end of the conveyor roller tube, wherein the second end cap is identical to the first end cap.

20. A motor-driven conveyor roller comprising:
a conveyor roller tube;
a first axle unit inserted into a first end of the conveyor roller tube;
a second axle unit inserted into a second end, opposite the first end, of the conveyor roller tube; and
a first bearing unit at the first end around which the conveyor roller tube is mounted so as to be correspondingly rotatable around the first axle unit;
a second bearing unit at a second end of the conveyor roller tube;
a drive unit;
a single gearing arranged in the conveyor roller tube and which transmits a torque generated by the drive unit between the conveyor roller tube and the first axle unit; and
a first end cap connected fixedly in terms of torque to the conveyor roller tube at the first end, the first end cap comprising two portions capable of being utilized as a gearing connection section, wherein alternatively one of the two portions defines the gearing connection section; and
a second end cap connected fixedly in terms of torque to the conveyor roller tube at the second end, the second end cap being of identical design to the first end cap and fastened in the conveyor roller tube mirror symmetrically with respect to the first end cap relative to a central cross-sectional area of the conveyor roller tube.

21. A motor-driven conveyor roller comprising:
a conveyor roller tube;
a first axle unit inserted into a first end of the conveyor roller tube;
a first bearing unit at the first end around which the conveyor roller tube is mounted so as to be correspondingly rotatable around the first axle unit;
a drive unit;
a single gearing arranged in the conveyor roller tube and which transmits a torque generated by the drive unit between the conveyor roller tube and the first axle unit; and
an end cap connected fixedly in terms of torque to the conveyor roller tube at the first end, the end cap comprising two portions capable of being utilized as a gearing connection section, wherein alternatively one of the two portions defines the gearing connection section;
wherein the single gearing consists of a metallic material and interacts with the gearing connection section through a first of the two portions capable of being utilized as a gearing connection section, or, alternatively, the single gearing consists of a polymer material and interacts with the gearing connection section through a second of the two portions capable of being utilized as a gearing connection section.

22. A motor-driven conveyor roller comprising:
a conveyor roller tube;
a first axle unit inserted into a first end of the conveyor roller tube;
a first bearing unit at the first end around which the conveyor roller tube is mounted so as to be correspondingly rotatable around the first axle unit;
a drive unit;
a single gearing arranged in the conveyor roller tube and which transmits a torque generated by the drive unit between the conveyor roller tube and the first axle unit; and
an end cap connected fixedly in terms of torque to the conveyor roller tube at the first end, the end cap comprising two portions capable of being utilized as a gearing connection section, wherein alternatively one of the two portions defines the gearing connection section;
wherein the single gearing has a first motor connection flange and the single gearing is adapted to be coupled by the first motor connection flange to a motor arranged in the conveyor roller tube, or, alternatively, the single gearing has a second motor connection flange and the single gearing is adapted to be coupled by the second motor connection flange to the motor arranged in the conveyor roller tube.

23. A motor-driven conveyor roller comprising:
a conveyor roller tube;
a first axle unit inserted into a first end of the conveyor roller tube;
a first bearing unit at the first end around which the conveyor roller tube is mounted so as to be correspondingly rotatable around the first axle unit;
a drive unit; and
an end cap adapted for interchangeable use with either a first gearing or a second gearing and which transmits a torque generated by the drive unit between the conveyor roller tube and the first axle unit, wherein the end cap comprises two portions capable of being utilized as a gearing connection section, wherein one of the two portions defines the gearing connection section for either of, alternatively, the first gearing or the second gearing.

* * * * *

UNITED STATES PATENT AND TRADEMARK OFFICE
CERTIFICATE OF CORRECTION

PATENT NO. : 10,640,296 B2  
APPLICATION NO. : 16/313952  
DATED : May 5, 2020  
INVENTOR(S) : Mans Page 1 of 1

It is certified that error appears in the above-identified patent and that said Letters Patent is hereby corrected as shown below:

In the Specification

Column 11, Line 24, "176-b" should be --176b--;

In the Claims

Column 13, Claim 11, Line 5, delete "is-"; and

Column 13, Claim 14, Line 26, delete "first-".

Signed and Sealed this  
Thirteenth Day of October, 2020

Andrei Iancu  
*Director of the United States Patent and Trademark Office*